(12) United States Patent
Princinsky et al.

(10) Patent No.: US 7,923,867 B2
(45) Date of Patent: Apr. 12, 2011

(54) ELECTROMAGNETIC NOISE SUPPRESSION SYSTEM FOR WYE POWER DISTRIBUTION

(76) Inventors: Daniel Princinsky, Saginaw, MI (US); William Hinton, Reese, MI (US)

( * ) Notice: Subject to any disclaimer, the term of this patent is extended or adjusted under 35 U.S.C. 154(b) by 0 days.

(21) Appl. No.: 12/303,212

(22) PCT Filed: Jun. 4, 2007

(86) PCT No.: PCT/US2007/070320
§ 371 (c)(1),
(2), (4) Date: Jul. 21, 2009

(87) PCT Pub. No.: WO2007/143605
PCT Pub. Date: Dec. 13, 2007

(65) Prior Publication Data
US 2009/0309425 A1    Dec. 17, 2009

Related U.S. Application Data

(60) Provisional application No. 60/811,307, filed on Jun. 5, 2006.

(51) Int. Cl.
*H02J 1/02* (2006.01)

(52) U.S. Cl. .......................................... 307/105

(58) Field of Classification Search ............ 307/105
See application file for complete search history.

(56) References Cited

U.S. PATENT DOCUMENTS

| | | | |
|---|---|---|---|
| 6,888,709 B2 | 5/2005 | Princinsky et al. | |
| 7,161,456 B2 * | 1/2007 | Knox | 336/90 |
| 2006/0087785 A1 * | 4/2006 | Bender et al. | 361/93.1 |

* cited by examiner

*Primary Examiner* — Fritz M Fleming
*Assistant Examiner* — Daniel Cavallari
(74) *Attorney, Agent, or Firm* — Baker Botts L.L.P.

(57) ABSTRACT

Three single-phase transformers having primary sides connected in a delta connection and the secondary sides connected in a series-delta connection. Each power line is connected through a fused disconnect to two primary terminals, each primary terminal on a different transformer. A second terminal on the secondary side of the first phase transformer is connected to a first terminal on the secondary side of the third transformer through a non-inductive grid resistor. The second terminal on the secondary side of the third transformer is connected to the first terminal on the secondary side of a second transformer. The second terminal on the secondary side of the second transformer is connected to the first terminal on the secondary side of the first transformer. In this fashion, the secondary sides of each of the single-phase transformers are connected in series through a non-inductive grid resistor.

7 Claims, 2 Drawing Sheets

ELECTROMAGNETIC NOISE SUPPRESSION SYSTEM FOR WYE POWER DISTRIBUTION

RELATED APPLICATION

This application is a national phase of International Application PCT/US07/070320 filed Jun. 4, 2007 which claims priority from U.S. Provisional Application No. 60/811,307, entitled "Electromagnetic Noise Suppression System for Wye Power Distribution," filed on Jun. 5, 2006, both of which are incorporated by reference herein in their entirety.

BACKGROUND OF THE INVENTION

In industrial settings such as plants, factories, or other large-scale systems that utilize three-phase power, switching power supplies and variable frequency drives, harmonic noise present in three-phase circuits can cause numerous problems. Harmonic noise can destroy electronic components, increase the number of control lock-ups requiring rebooting, shorten the life of electric motors, and lower system reliability.

These harmonics may be caused by switching occurring at an upstream power-station, switch mode power supplies and variable frequency drives, or numerous other events. Such harmonics can severely damage or destroy equipment connected to the affected three-phase circuit, or, when the system employs circuit interrupters, can cause those interrupters to open the circuit, resulting in power outages throughout the plant. Such outages have negative economic effects since productive equipment remains non-functional until the circuit is re-energized.

Inductors have been used for harmonic mitigation for many years. However, the prior art systems have several shortcomings. Variable frequency drives generate more noise when running with a light load, and inductors, which are current smoothing devices, are ineffective at removing electrical noise including harmonics. Such a system causes stress on devices connected to the circuit and may damage or cause permanent failure of the components. Additionally, the solid-state components used in the drive systems are degraded by the harmonics caused by the drive itself.

SUMMARY OF THE INVENTION

The present invention is an apparatus for reducing line harmonics, Electromagnetic Interference (EMI), Radio Frequency Interference (RFI), and the effects of line-to-line transients on Wye power distribution systems. Line harmonics are overcome by the present invention which, in one exemplary embodiment, employs three single-phase transformers and a non-inductive grid resistor to form an electromagnetic noise suppression circuit.

In various embodiments, the techniques of the present invention may result in several advantages. The present invention can lower electrical noise in a Wye power system by attenuating voltage and current imbalances caused by phase or line harmonics. A zero sequence circuit may be used to utilize the Harmonic Silencer dual voltage balancing circuit to assist stabilizing the line voltages and reduce line harmonics in a Wye power system. In addition, by attenuating line voltage and current imbalances caused by phase or line harmonics, the present invention allows users of three-phase power to reliably operate a higher percentage of non-linear loads; reduce the number of failures of electronic circuit boards, PLC controllers, CNC controllers, and electronic drives and controls; reduce the number of control lock-ups requiring rebooting; extend the life of electric motors; increase total system reliability and uptime; extend the life of solid-state TVSS units typically damaged by line harmonics; reduce the level of harmonic voltage and current distortion phase-to-phase and phase-to-ground; and prevent surges by instantly engaging with only a few millivolts of line imbalance.

The present invention also improves efficiency by removing power system waveform distortion. Electric power system waveform distortion decreases induction motor efficiency through different mechanisms. Increased motor heating due to unnecessary current in windings causes increased winding resistance and added losses. Unsynchronized electromagnetic forces caused by distortion force the motor to work harder to generate the same power output.

One exemplary embodiment of the invention includes three single-phase transformers, each of which has a primary side and secondary side. The three transformer cores are electrically insulated and isolated from ground and from each other. The three single-phase transformers have their primary windings connected in a delta connection and their secondary windings connected in a series-delta connection. Each power line is connected through a fused disconnect to two primary terminals, each primary terminal on a different transformer.

A second terminal on the secondary side of the first phase transformer is connected to a first terminal on the secondary side of the third transformer through a resistor. The second terminal on the secondary side of the third transformer is connected to a first terminal on the secondary side of a second transformer. The second terminal on the secondary side of the second transformer is connected to the first terminal on the secondary side of the first transformer. In this fashion, the secondary sides of each of the single-phase transformers are connected in series through a non-inductive grid resistor.

BRIEF DESCRIPTION OF THE DRAWINGS

For a more complete understanding of the present invention, reference is made to the following detailed description of exemplary embodiments with reference to the accompanying drawings in which.

DETAILED DESCRIPTION OF THE EXEMPLARY EMBODIMENT

Figure 1:
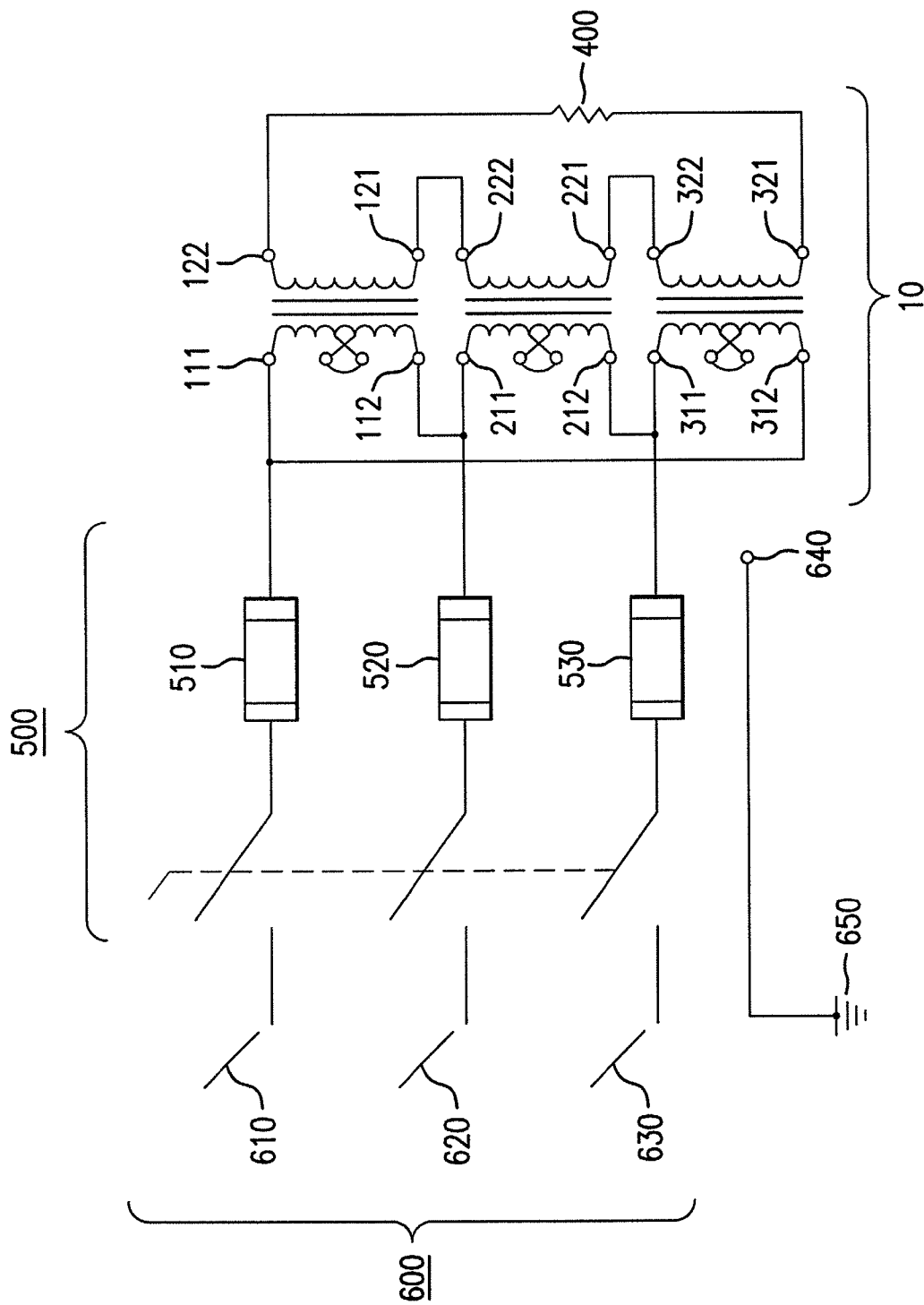
FIG. 1 is a schematic diagram illustrating an overview of one embodiment of the present invention.

FIG. 1 illustrates a conceptual overview of the overall architecture of the present invention. As illustrated, three single-phase transformers, 100, 200, 300 and a non-inductive grid resistor 400 are connected to form a noise suppression circuit 10.

Each of the three single-phase transformers has a respective first terminal 111, 211, 311 that is connected to a respective single-phase power line 610, 620, 630 on the power-supply bus 600 through a fused disconnect 500. In a preferred embodiment, an equipment ground bond 640 is also connected to an isolated ground bus 650 to bond the enclosure to ground for safety, such as by a ground mat.

A second terminal 112 on the primary side of one of the single-phase transformers 100 is connected to a first terminal 211 on the primary side of a second of the single-phase transformers 200. A second terminal 212 on the primary side of the second of the single-phase transformers 200 is connected to a first terminal 311 on the primary side of a third of the single-phase transformers 300. A second terminal 312 on the primary side of the third of the single-phase transformers 300 is connected to a first terminal 111 on the primary side of the first of the single-phase transformers 100.

A second terminal 122 on the secondary side of the first of the single-phase transformers 100 is connected to a first terminal 321 on the secondary side of the third of the single-phase transformers 300 through the non-inductive grid resistor 400. A second terminal 322 on the secondary side of the third of the single-phase transformers 300 is connected to a first terminal 221 on the secondary side of the second of the single-phase transformers 200. A second terminal 222 on the secondary side of the second of the single-phase transformers 200 is connected to a first terminal 121 on the secondary side of the first of the single-phase transformers 100. In this fashion, the secondary sides of each of the single-phase transformers, 100, 200, 300 are connected in series through the non-inductive grid resistor 400.

The electromagnetic noise suppression circuit 10 protects any equipment on the power bus 600 against line harmonics and other electromagnetic noise on any of the three phases. The circuit 10 operates as a low impedance path for harmonics whenever harmonic noise is present. Harmonic noise on any phase creates an unbalance on the primary side of its respective single-phase transformer 100, 200, 300, causing the current to flow through the secondary side of the transformer and through non-inductive grid resistor 400, which functions to dissipate any excess energy induced by the harmonics. At this time, feedback from the secondary side of the transformer to the primary side of the transformer will pull the voltage level on the affected line back to its normal voltage. During a fault, the secondary-to-primary feedback will cause the voltage to rise on the noisy primary phase, and conversely, during a line transient, the voltage will drop on the affected primary phases.

It will be apparent to one of ordinary skill in the art that the present invention can be designed to accommodate differing levels of system voltages and frequencies. The transformer windings, size of the non-inductive grid resistor 400, and fuse current ratings of the fused disconnect 500 can all be adjusted using well-known formulas to ensure the suppression circuit is suited for its environment. Thus, it will be understood that each of the single-phase transformers shown in FIG. 1 may employ any arbitrary winding ratio, such as 4:1, chosen in light of the needs of the power system being protected.

In one exemplary embodiment, the single-phase transformers 100, 200, 300 in FIG. 1 employ a winding ratio of 4:1, but other winding ratios may be employed if appropriate. Furthermore, the wiring is #10 AWG rated for 600 V, and each fuse in the fused disconnect 500 is rated for 5 Amperes. The non-inductive grid resistor 400 is rated for approximately 22 Ohms at nominal operating temperature. Selection of transformers, winding ratios, and resistor values depend on the system the circuit is intended to protect.

In an exemplary embodiment, the three primary windings are each 1,000 VA making a 3,000 VA 3-phase delta primary. The three secondary windings are each 1,000 VA making a 3,000 VA 3-phase series-delta secondary. The primary is connected for 480 V 3-phase. Each secondary is connected for 120 V. The line amperage capacity for the primary is 3.6 amps+15%. The phase amperage capacity for the primary is 2.08 amps+15%. (Calculated assuming line current/1.732). The overload capacity for the series-delta secondary is 8.3+15% amps (calculated assuming 208 V/22.1 Ohms). The resistance of the non-inductive grid resistor is 22.1 Ohms. The power rating of the grid resistor is 7800 watts (600 volt rated×13 amp rated). The grid resistor may be loaded to approximately 2000 watts. (Calculated assuming 208 V×9.41 amps). The fuses are selected to be end-of-life protection and will open only if a component fails (calculated assuming 3.6+15%×1.67=7 amps). In this exemplary embodiment, three 1000 VA Control Power Transformer 9070 Type T Square D from Schneider Electric SA, 43-45, boulevard Franklin-Roosevelt, 92500 Rueil-Malmaison—France may be employed. In this embodiment, the primary capacity is 3000 VA+15% (3450 VA) and the secondary capacity is 3000 VA+15% (3450 VA).

One embodiment entails a power filter that acts like an unloaded three-phase transformer when all phases are balanced. Should there be harmonics injected into the power system from any source, the three-phase delta primary winding and three-phase series-delta secondary will have circulating current caused by the harmonics. This circulating current is reduced and filtered by the three transformers and non-inductive grid resistor at the square of the harmonic. The third harmonic is reduced by a factor of nine, the ninth harmonic is reduced by a factor of eighty-one, etc.

This embodiment may be considered to be a zero sequence circuit that uses virtually no power when the phase voltages are balanced. When the phase voltages are balanced, each single-phase primary has about 277 V (480/1.732) across it, which reflects about 69 V across each single-phase secondary. As noise or harmonics from anywhere on the distribution system fed from the power transformer starts to cause an instantaneous imbalance in line voltages, the secondary voltages are no longer equal. This causes secondary currents to circulate through the non-inductive grid resistor 400 and the energy from the imbalance is limited and dissipated by the non-inductive grid resistor 400.

The non-inductive grid resistor 400 is chosen to limit the current to maximum current for the transformer design. With a harmonic content of 100% this could cause a maximum primary imbalance of 0 V, 480 V, and 480 V on the three phases; secondary voltages of about 0 V, 120 V, and 120 V would be expected. The voltage across the non-inductive grid resistor 400 will therefore be about 208 V (120×1.732). To handle this condition and to handle other electrical noise and current during maximum imbalance (being mindful that single-phase transformers are utilized in the exemplary embodiment), the primary of 480 V×2.3 A=1,104 VA. The transformers selected for this unit are each 1 kVA, with a turns ratio of 4-to-1, a voltage ratio of 4- to -1 and a current ratio of 1- to -4. The secondary current will be a maximum of 9.2 A (2.3×4). The resistance of the non-inductive grid resistor is about 22.1 Ohms. The power that the non-inductive grid resistor 400 must handle is about 1,913 W [(120×1.732)×9.2] (times 2 for continuous duty). The non-inductive grid resistor 400 has a positive temperature coefficient so the circuit is self-protecting.

Figure 2:
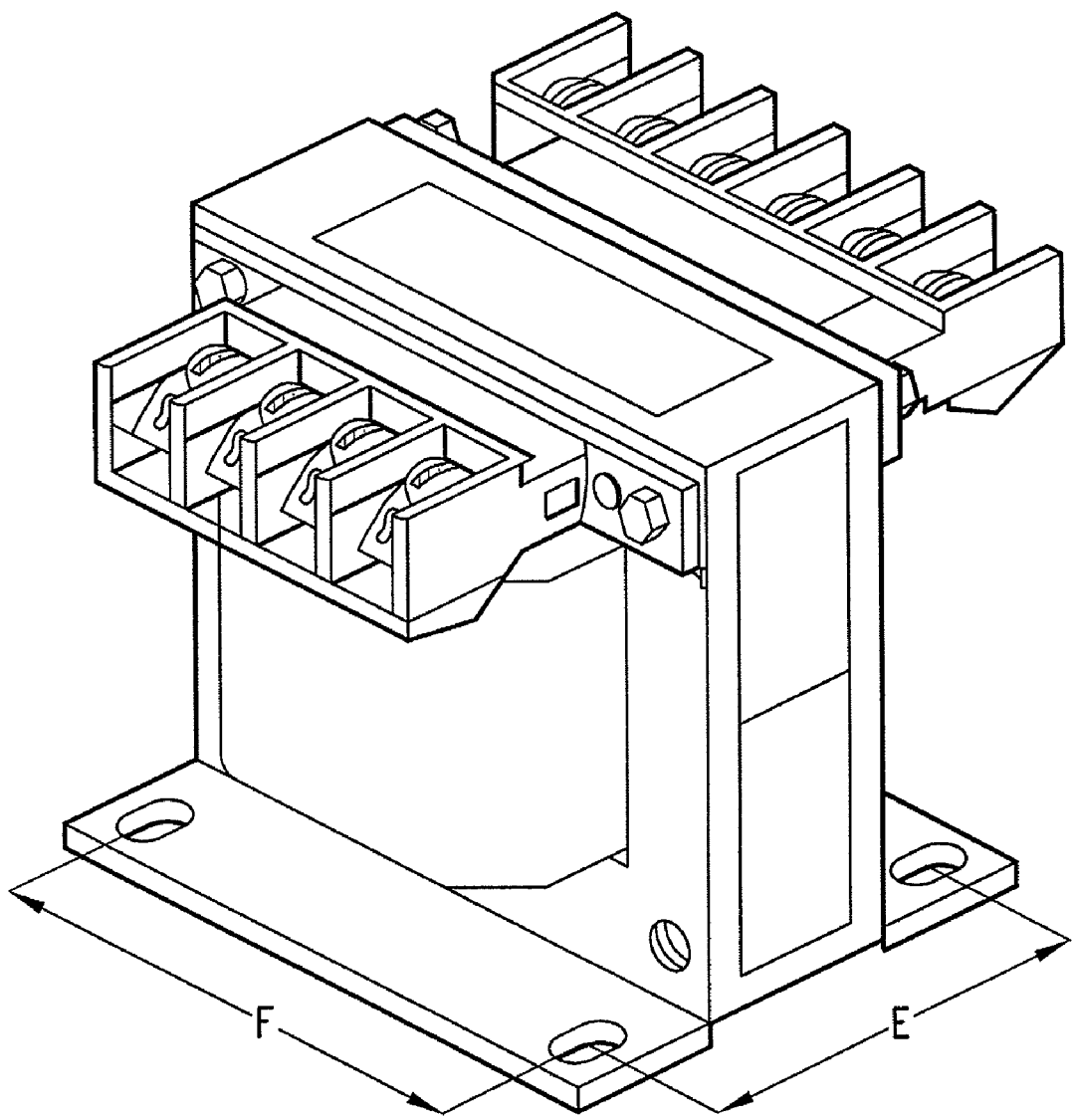
FIG. 2 is a three-dimensional elevated view showing one embodiment of the present invention.

One exemplary embodiment of a single-phase transformer that may be used in connection with the present invention is shown in FIG. 2. In one exemplary installation of the present invention, flanges E and F of the transformer as shown in FIG. 2 are attached to the back plate using a non-conducting sleeve and washer to isolate the transformer from the enclosure.

It will be understood to one of ordinary skill in the art that modifications, additions and substitutions could be made to the described exemplary embodiments without departing from the scope or spirit of the invention, which is defined in the appended claims. For example, a cooling fan could be placed in parallel with the non-inductive grid resistor 400 to dissipate heat produced during the operation of the circuit. Further, it may be possible to utilize a single three-phase transformer in place of the three single-phase transformers, if a suitable transformer core to avoid electromagnetic coupling between the three phases were used.

We claim:

1. An apparatus for suppressing harmonic noise in a three-phase power supply bus, said power supply bus comprising at least a first, second and third power line, each power line corresponding to a respective phase of the three-phase power supply bus, the apparatus comprising:
   a) a disconnect having an input side and an output side, said input side coupled to at least said first, second and third power lines and said output side of said disconnect having a first, second and third output nodes;
   b) a first transformer having a primary side and a secondary side, said primary side having a first primary terminal and a second primary terminal, said first primary terminal coupled to said first output node of said disconnect, and said secondary side of said first transformer having a first secondary terminal and a second secondary terminal;
   c) a second transformer having a primary side and a secondary side, said primary side having a third primary terminal and a fourth primary terminal, said third primary terminal coupled to said second output node of said disconnect and to said second primary terminal, said secondary side of said second transformer having a third secondary terminal and a fourth secondary terminal, said fourth secondary terminal coupled to said first secondary terminal;
   d) a third transformer having a primary side and a secondary side, said primary side having a fifth primary terminal and a sixth primary terminal, said fifth primary terminal coupled to said third output node of said disconnect and to said fourth primary terminal, said sixth primary terminal coupled to said first primary terminal, said secondary side of said third transformer having a fifth secondary terminal and a sixth secondary terminal, said sixth secondary terminal coupled to said third secondary terminal; and
   e) a non-inductive grid resistor, coupled between said second secondary terminal and said fifth secondary terminal.

2. The apparatus of claim 1, wherein the non-inductive grid resistor is rated for approximately 22 Ohms at normal operating temperature.

3. The apparatus of claim 1, wherein the circuit has a cooling device in place, such as a fan to assist in dissipating the heat produced during operation of the circuit.

4. The apparatus of claim 1, wherein the winding ratio of each single-phase transformer is approximately four (4) to one (1).

5. The apparatus of claim 1, wherein an enclosure surrounds said transformers and said resistor, said enclosure having a ground bond connected to an isolated ground bus.

6. An apparatus for suppressing harmonic noise in a three-phase power supply bus, said power supply bus comprising at least a first, second and third power line, each power line corresponding to a respective phase of the three-phase power supply bus, said apparatus comprising:
   a) a means for interfacing with said first, second and third power lines;
   b) a first transformer having a primary side and a secondary side, said primary side having a first primary terminal and a second primary terminal, said first primary terminal coupled to said interface means, and said secondary side of said first transformer having a first secondary terminal and a second secondary terminal;
   c) a second transformer having a primary side and a secondary side, said primary side having a third primary terminal and a fourth primary terminal, said third primary terminal coupled to said interface means and to said second primary terminal, said secondary side of said second transformer having a third secondary terminal and a fourth secondary terminal, said fourth secondary terminal coupled to said first secondary terminal;
   d) a third transformer having a primary side and a secondary side, said primary side having a fifth primary terminal and a sixth primary terminal, said fifth primary terminal coupled to said interface means and to said fourth primary terminal, said sixth primary terminal coupled to said first primary terminal, said secondary side of said third transformer having a fifth secondary terminal and a sixth secondary terminal, said sixth secondary terminal coupled to said third secondary terminal; and
   e) a means for dissipating power, coupled between said second secondary terminal and said fifth secondary terminal.

7. The apparatus of claim 6, wherein an enclosure surrounds said transformers and said means for dissipating power, said enclosure having a ground bond connected to an isolated ground bus.

\* \* \* \* \*